United States Patent [19]

Hirose et al.

[11] Patent Number: 5,318,812
[45] Date of Patent: Jun. 7, 1994

[54] RESIN COMPOSITION AND FOOD PACKAGING MATERIALS FORMED THEREFROM

[75] Inventors: Kazuhiko Hirose, Abiko; Nobuyuki Hisazumi, Tsuchiura; Shinichiro Funabashi, Niihari; Hiroyuki Ohba, Niihari; Hideaki Tanaka, Niihari, all of Japan

[73] Assignee: Kureha Chemical Industry Company, Ltd., Tokyo, Japan

[21] Appl. No.: 115,658

[22] Filed: Sep. 3, 1993

Related U.S. Application Data

[62] Division of Ser. No. 918,015, Jul. 24, 1992, Pat. No. 5,270,372.

[30] Foreign Application Priority Data

Jul. 26, 1991 [JP] Japan ................................ 3-66004[U]
Jul. 26, 1991 [JP] Japan ................................ 3-208896

[51] Int. Cl.⁵ ............................................. B29D 22/00
[52] U.S. Cl. ................................ 428/36.6; 426/106; 426/118; 428/522; 428/334
[58] Field of Search ............... 428/334, 36.6; 524/302, 524/386, 388; 426/106, 118, 130

[56] References Cited

U.S. PATENT DOCUMENTS

4,206,101  6/1980  Wysong .

FOREIGN PATENT DOCUMENTS

0079712  5/1983  European Pat. Off. .
0389695 10/1990  European Pat. Off. .
0454850 11/1991  European Pat. Off. .
2603648  8/1976  Fed. Rep. of Germany .
1033449  6/1966  United Kingdom .

OTHER PUBLICATIONS

"Structure of the Hydrogels Obtained by Blending Poly(vinyl alcohol) with Alginic Acid and Repeated Freezing and Thawing", Kobunshi Ronbunshu, 48, (1991), No. 12, pp. 775-780, Tokyo, Japan.

Primary Examiner—Edith Buffalow
Attorney, Agent, or Firm—Sherman and Shalloway

[57] ABSTRACT

Food packaging-use formed articles including at least one layer of a 3 to 90 microns thickness which comprises a composition consisting of polyvinyl alcohol resin having a degree of saponification of 60 to 95 mole % (A) and a compound elected from a group of alkylene glycol polymer, etc. falling within the range of from 3 weight parts of (B) to 100 weight parts of (A) to the saturated solubility of (B) in (A) and having a carbon dioxide/oxygen solubility ratio ($SCO_2/SO_2$) of 30 or higher.

Furthermore, a resin composition consisting of the aforementioned (A), (B) and a saponified ethylene/vinylacetate copolymer resin (C) wherein the blending ratio of (B) is within the range of from 3 weight parts of (B) to 100 weight parts of (A) to the saturated solubility of (B) in (A), and the blending ratio of (C) being 20 to 50 weight parts of (C) to 100 weight parts of an aggregate of (A) and (C), and food packaging-use melt extruded articles containing at least one layer comprising the aforementioned composition.

8 Claims, 1 Drawing Sheet

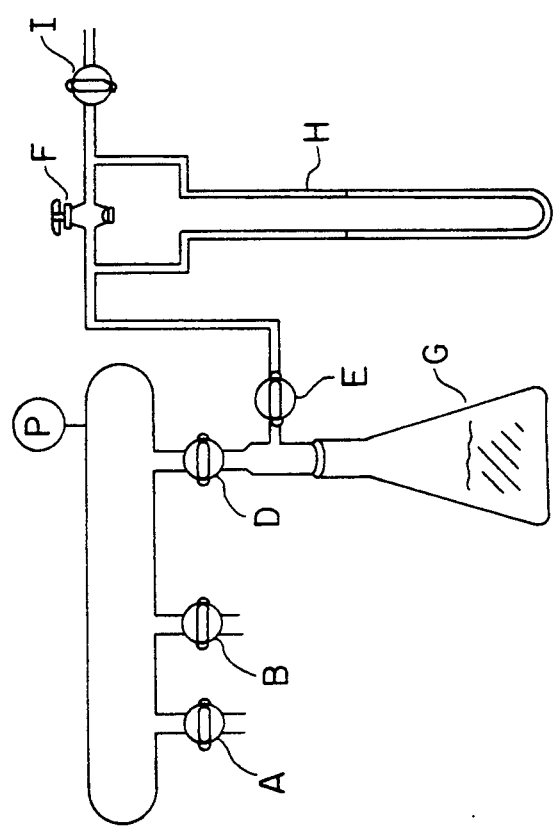
FIG. I

RESIN COMPOSITION AND FOOD PACKAGING MATERIALS FORMED THEREFROM

This is a division of application Ser. No. 07/918,015 filed Jul. 24, 1992 now U.S. Pat. No. 5,270,372.

BACKGROUND OF THE INVENTION

1. Technical Field of the Invention

The present invention relates to a resin composition and formed articles obtained therefrom such as films, and furthermore relates to the application of said formed articles and the like to food packaging use. More particularly, the present invention relates to formed articles such as films excellent in the selective gas permeability obtained from a composition comprising polyvinyl alcohol resin (hereinafter abbreviated as "PVA") and specific compounds, and, furthermore, to the application of the aforementioned formed articles to food packaging use.

2. Description of the Prior Art

In the food packaging industry, technological innovation has been achieved in the recent years so remarkably that today's food packaging operations always call for optimal performances to be imparted by each kind of stock material for a given kind of food to be packaged.

Taking the cheese product, which is a kind of fermented foodstuff, for example, wax-coated packaging material has been conventionally used for packaging the natural cheese, whereas plastic materials have also been adopted for the purpose of improving the appearance, increasing the eatable portion and furthermore, for the manufacturing cost reduction's sake. Natural cheese being added with live bacteria to permit the ripening process to progress therein, the bacteria generate carbon dioxide not only during the ripening step, but throughout the later stages of physical distribution. Since such cheese packaged with the ordinary kind of plastic bag swells up with generated carbon dioxide gas, the introduction of such packaging material as will readily transmit carbon dioxide has been awaited. On the other hand, since oxygen has adverse effects such that oxygen accelerates growth of molds on the cheese and also oxidizes the fat content of the cheese, the trade concerned has been desirous of having a packaging material which suppresses transmission of oxygen. For foodstuff other than cheese, e.g. coffee bean, packaging materials that readily permits permeation of carbon dioxide, but considerably restrains permeation of oxygen have been desired.

Although it is desirable that plastic packaging materials intended for use on cheese product, coffee bean, etc. have higher gas transmission rate (hereinafter abbreviated as "GTR") to carbon dioxide and lower GTR to oxygen, such plastic packaging materials that have high GTR to carbon dioxide, almost without any exception, will have high GTR to oxygen.

Therefore, such packaging materials that have low oxygen GTR and have large carbon dioxide GTR to oxygen GTR, namely, high carbon dioxide/oxygen GTR ratio have been wanted.

There is described in the patent gazette of Published Patent Sho 44-2576 a process for producing a PVA film insoluble in cold water and soluble in warm water of 40 Deg. C. or higher, which is obtained by extruding a specific PVA added with a plasticizer, as a separation membrane. It is described in the same gazette that while glycerin is used as the plasticizer, polyethylene glycol can be also used. The film thus obtained, however, is used as the unit package material for detergent and agricultural chemical and as laundry bags. It is not used as a food packaging material for which selective gas permeability is particularly required.

Besides, there is described in the patent gazette of Published Patent Sho 54-15029 (U.S. Pat. No. 4,073,733) a process for producing a web possessing gas permeability by coagulating polyethylene glycol-containing PVA in a liquid phase, although the web thereby obtained is used for separation of urea and vitamin, and is not utilized as a food packaging material, for which selective gas permeability is required, similarly to the case described in Patent Publication Sho 44-2576.

OBJECT OF THE INVENTION

The object of the present invention is to provide packaging materials having low oxygen GTR and, additionally high carbon dioxide/oxygen GTR ratio.

SUMMARY OF THE INVENTION

The first category of the present invention is a formed article suitable for the food packaging use containing at least one layer having a thickness of 3 to 90 microns which comprises a composition consisting of a PVA resin having a degree of saponification of 60 to 95 mole % (A) and a compound having a carbon dioxide/oxygen solubility ratio ($SCO_2/SO_2$) of 30 or higher selected from a group of alkylene glycol, hydroxy acid monomer and polymers thereof ($B_1$) falling within the range of from 3 weight parts of ($B_1$) per 100 weight parts of (A) to the saturated solubility of ($B_1$) in (A).

Said compound ($B_1$) is preferably butanediol, ethylene glycol, lactic acid or polymers thereof. Said food packaging-use formed article is preferably in the form of film, sheet or tray, and the suitable food to be packaged is preferably cheese.

The second category of the present invention is a resin composition comprising a PVA resin having a degree of saponification of 60-95 mole % (A), a compound having a carbon dioxide/oxygen solubility ratio ($SCO_2/SO_2$) of 30 or more, selected from a group of alkylene glycol monomer and polymers thereof ($B_2$), and a saponified ethylene/vinyl acetate copolymer (C), wherein the blending ratio of ($B_2$) is within the range of from 3 weight parts of ($B_2$) to 100 weight parts of (A) to the saturated solubility of ($B_2$) in (A) and the blending ratio of (C) is 20 to 50 weight parts of (C) per 100 weight parts of an aggregate of (A) and (C). In this case, the compound ($B_2$) is preferably polyethylene glycol.

The third category of the present invention is a melt-extruded product containing at least one layer of a resin composition comprising a PVA resin having a degree of saponification of 60 to 95 mole % (A), a compound having a carbon dioxide/oxygen solubility ratio ($SCO_2/SO_2$) of 30 or more selected from a group of alkylene glycol monomer and polymers thereof ($B_2$) and a saponified ethylene/vinyl acetate copolymer (C), wherein the blending ratio of ($B_2$) is within the range of from 3 weight parts of ($B_2$) per 100 weight parts of (A) to the saturated solubility of ($B_2$) in (A) and the blending ratio of (C) is within the range of 20 to 50 weight parts of (C) per 100 weight parts of an aggregate of (A) and (C). It is preferable that it is offered to usage as a food packaging film in the form of extruded article. The preferred kind of food to be packaged is cheese.

BRIEF DESCRIPTION OF THE DRAWING

FIG. 1 illustrates an apparatus for measuring the solubilities of carbon dioxide and oxygen to organic compounds, respectively.

DETAILED DESCRIPTION OF THE PREFERRED EMBODIMENTS

The degree of polymerization of the PVA(A) used in the present invention is preferably 300 or higher as measured according to JIS-K6726 from the viewpoint of strength of the film obtained from the composition mentioned in the following, and preferably 3500 or lower from the viewpoint of the processability, and, furthermore, particularly preferably in the range of 500 to 2000. While the degree of saponification of the PVA which is used is within the range of 60 to 95 mole %, it is preferably in the range of 60 to 90 mole %, and more preferably in the range of 60 to 80 mole %. From the viewpoint of the oxygen GTR, the degree of saponification of PVA of 60 mole % or higher and 95 mole % or lower are both preferable, since the former reduces the oxygen GTR of the obtained film and the latter keeps the saturated solubility of the compound (B) from being reduced excessively. Moreover, a PVA having a degree of saponification of 95 mole % or lower is preferable in that it gives a wide temperature differential between the melting point and the thermal decomposition initiating temperature, namely, the processable temperature range.

The compound (B) used in the present invention is selected from a group of alkylene glycol, hydroxy acid monomer and polymers thereof and its carbon dioxide/oxygen solubility ratio ($SCO_2/SO_2$) is preferably 30 or higher, or more preferably 50 or higher. Examples of alkylene glycol include such monomers as ethylene glycol, propylene glycol, 1,2-butanediol, 1,3-butanediol, 1,4-butanediol, and 2,3-butanediol. As a typical example of their polymers, polyethylene glycol (hereinafter abbreviated as "PEG") can be mentioned. It is preferable that among alkylene glycols, 1,2-butanediol and 1,4-butanediol be used.

Monomers of hydroxy acid include lactic acid and esters of lactic acid. Moreover, as polymers of hydroxy acid, there can be mentioned polymer of lactic acid. Out of the aforementioned monomers and polymers, it is preferable that lactic acid be used.

The first category of the present invention is explained as follows.

While the compound ($B_1$) in the first category of the present invention is selected from among the aforementioned compounds, it is preferable that PEG, as the preferable polymer, has an average molecular weight of 400 or more for such reason that it does not readily lost during the film forming step by the melt extrusion technique. On the other hand, there is not any particular upper limit for the average molecular weight of PEG. However, it is preferable that the average molecular weight be about 2000 or less from the viewpoint of miscibility with PVA.

The lower limit of the blending ratio of the compound ($B_1$) in the composition of PVA and the compound ($B_1$) is 3 weight parts of the compound ($B_1$) per 100 weight parts of PVA, preferably 5 weight parts of the compound ($B_1$) per 100 weight parts of PVA. By means of blending more than 3 weight parts of the compound ($B_1$), the carbon dioxide/oxygen GTR ratio of the obtained film or the like is improved. On the other hand, as regards the upper limit of the blending ratio of the compound ($B_1$), the carbon dioxide/oxygen GTR increases with an increase in the blending ratio of the compound ($B_1$). However, the upper limit is set at the saturated solubility of the compound ($B_1$) in PVA, since so far as the blending ratio of the compound ($B_1$) is within the saturated solubility, the amount of the compound ($B_1$) lost from the film forming step described hereinafter is kept small and the 'bleed-out' (exudation) of the compound ($B_1$) from the obtained film can be suppressed. Said effect is particularly conspicuous in cases where PEG is used as the compound ($B_1$). The saturated solubility decreases with an increase in the degree of saponification of PVA.

Various kinds of stabilizers, antiblocking agents, lubricants, colorants, fillers, and the like may be contained in said composition in addition to said two components, if necessary, to the extent that the effects achieved by the present invention are not impaired.

There is not any particular limitation with respect to the method of mixing PVA with the compound ($B_1$). For example, PVA is impregnated with the compound ($B_1$) with heating at about 60 Deg. C. and after leaving such PVA to stand for several hours to allow it to undergo aging, this PVA is formed into film or the like by the method described in the following. It is preferable that a composition pelletized by a twin-screw extruder or the like beforehand is used as the raw material for the film forming or the like. However, in cases where a monomer is used as the compound ($B_1$) and thus pelletization of the impregnated material by a twin-screw extruder is difficult for the evaporation of the compound ($B_1$) by being heated, the impregnated material may be formed as it is.

The obtained impregnated mixture or pelletized material is formed into such articles as film, sheet and tray. Although the melt extrusion technique is preferable as the forming method in case where polymer is used as the compound ($B_1$), there is no limitation with respect to the forming method. Moreover, in case of the film, which being the particularly preferable formed article, it may be oriented monoaxially or biaxially. As for the forming method, film may be obtained, for example, by the compression molding, the T-die extrusion, the coextrusion by a circular die, the deep drawing or the solution casting method which comprises rendering said composition into a solution by dissolving it in a solvent such as water, dripping the solution onto a solid smooth surface and then evaporating the solvent. Particularly, in cases where a monomer is used as the compound ($B_1$), it is preferable that film be formed by the solution casting method. In cases where a laminated film is formed by laminating other kinds of resin over a core layer made from a composition consisting of PVA and a polymer as the compound ($B_1$), it is preferable to employ such methods as the extrusion lamination method, the coextrusion lamination method and the coextrusion/blown bubble method. In cases where film formed by the solution casting method from a composition wherein monomer is used as the compound ($B_1$) is utilized as the stock film to produce a laminated film by laminating other kinds of resin onto such stock film, primarily the lamination technique is employed.

With regard to the film thickness, film is formed in such a manner that the core layer is 3 to 90 microns, preferably 5 to 50 microns, although the optimal value varies by whether the film produced from said composition is used independently or such film is used as the core layer to be combined with other kinds of resin. A thickness of 3 microns or thicker is preferable because of its small enough oxygen GTR. A thickness of 90 microns or thinner is preferable for the economic reason. The oxygen GTR and the carbon dioxide GTR may be varied by adjusting the thickness of the core layer.

Although the core layer may be used independently as a formed article comprising said composition as mentioned in the foregoing, it is particularly preferable for the purpose of improving the water repellency and heat sealability and securing a practical strength that it be used in the form of a laminated film produced with other thermoplastic resin layer or layers. Such lamination may be constructed of two layers, with the core layer comprising said composition and another resin layer, or constructed of three layers obtained by laminating other resin layers onto the both sides of the core layer, or even additional layers. In cases where other thermoplastic resin layers are laminated onto the core layer, such external layers may be constructed of a same kind of resin or different kinds of resin. However, in such cases, it is preferable that a resin possessing the heat sealable property be used for the inside layer of the intended packaging material and a resin which imparts a reinforcing effect be used for the outside layer. For the thermoplastic layers laminated over the core layer, those which do not impair the selective gas permeability of the core layer are selected. In particular, such thermoplastic resin layer having an oxygen GTR of 1000 cc/m$^2$.day.atm., 30 micron thickness (at 30 Deg. C., dry) or higher is preferable.

For the film to package such foodstuff that generates carbon dioxide gas and does not tolerate extensive exposure to oxygen, like cheese product and coffee bean, is packaged, it is preferable that it has an oxygen GTR of 400 cc/m$^2$.day.atm., (30 Deg. C., dry) or less, preferably 300 cc/m$^2$.day.atm., (30 Deg. C., dry) or less, and a carbon dioxide/oxygen GTR ratio of 5 or more, preferably 6 or more.

There can be mentioned as examples of preferable kinds of thermoplastic resin to be laminated onto the core layer at least one kind of ethylene copolymer wherein its comonomer being selected from among vinyl acetate, and acrylates such as ethyl acrylate, methyl acrylate, and methyl methacrylate, or polyolefin resins such as high pressure process low-density polyethylene, linear low-density polyethylene (L-LDPE), polypropylene, and ionomer, and, furthermore, polyamide resins. An adhesive resin layer may be used for laminating the external layer onto the core layer. There can be mentioned as examples of the adhesive resin the thermoplastic polymer containing carboxyl group or its derivative, such as polyolefin graft-modified with maleic acid, fumaric acid or maleic anhydride, the resins obtained by copolymerizing those monomers with olefins, and, moreover, adipic acid polyesters having urethane-combined carboxyl group.

The films provided by the present invention having small oxygen GTR and large carbon dioxide/oxygen GTR ratio, they are particularly suitable for uses as packaging materials for the cheese product like natural cheese, coffee bean and the like.

Next, explanation is made on the composition falling in the second category of the present invention and the melt extruded articles containing at least one layer of the layer comprising said composition which falls in the third category of the present invention.

The resin composition of the second category of the present invention comprises said PVA (A), said composition (B$_2$) and a saponified ethylene/vinyl acetate copolymer resin (hereinafter abbreviated as "EVOH") (C). The compound (B$_2$) is preferably PEG. Of all blending ratios of the components, the PVA (A)-/EVOH (C) blending ratio is preferably within the range of 20 to 50 weight % of EVOH to an aggregate of PVA and EVOH, particularly within the range of 30 to 40 weight %. Said blending ratios are desirable in that the oxygen GTR is not excessively large so long as EVOH is contained by 20 weight % or more and that the carbon dioxide/oxygen GTR ratio is increased if EVOH is contained by 50 weight % or less. The lower limit of the blending ratio of the compound (B$_2$) is 3 weight parts per 100 weight parts of PVA, preferably 5 weight parts. The carbon dioxide/oxygen GTR ratio of the film is improved by blending the compound (B$_2$) by 3 weight parts or more. On the other hand, as regards the upper limit of the blending ratio of the compound (B$_2$), the carbon dioxide/oxygen GTR ratio of the film increases with an increase in the blending ratio of the compound (B$_2$). However, since it is principally PVA that dissolves the compound (B$_2$) in the composition, and the amount of lost compound (B$_2$) during the film forming step (described in the following) is minimal and the 'bleed-out' (exudation) of the compound (B$_2$) from the obtained film is suppressed so long as the compound (B$_2$) is contained within the limit of the saturated solubility of the compound (B$_2$) as opposed to PVA, the upper limit of the blending ratio of the compound (B$_2$) is set at the saturated solubility of the compound (B$_2$). Such saturated solubility decreases with an increase in the degree of saponification of PVA.

In addition to said three components, there may be added to said composition, if necessary, various kinds of stabilizers, antiblocking agents, lubricants, colorants and fillers to the extent that they do not impair the effect of the present invention.

While there is no particular limitation with respect to the method for mixing the components of PVA (A), the compound (B$_2$) and EVOH (C), an example of a preferable method is that PVA impregnated with the compound (B$_2$) with heating at about 60 Deg. C is left to stand for several hours to undergo aging and the obtained substance is dry blended with EVOH (C). In case the compound (B$_2$) used is of a type which is solid at ambient temperature, those three components may be dry blended directly. The mixture is formed into film and the like. It is preferable that a composition pelletized beforehand by a twin-screw extruder or the like be used.

The obtained impregnated mixture or pellet is formed into formed articles such as film, sheet, tray, and the like. While the melt extrusion is preferable as the forming method, the forming method is not limited thereto alone. In the case of film, which being the particularly preferable formed article, film may be oriented monoaxially or biaxially. Such methods as the compression molding, extrusion by T-die, coextrusion by a circular die and deep draw forming may be employed as the forming method. Particularly, in cases where laminated films are formed by combing a core layer made from the composition of the present invention with other kind or kinds of resin as mentioned in the following, such methods as the extrusion lamination, coextrusion lamination and coextrusion lamination may be employed.

With regard to the film thickness, film is formed so that the core layer will have a thickness of 3 to 50 microns, preferably 5 to 30 microns, although the optimal thickness varies with whether the film produced from the composition of the present invention is used independently, or the film made from the composition of the present invention is used as the core layer for producing a laminate with films made from other kind of resin.

In cases where foodstuff which copiously generates carbon dioxide and does not tolerate extensive exposure to oxygen like cheese products, coffee bean, and the like is packaged, it is preferable that the oxygen GTR of the core layer of the package film comprising the composition of the present invention be 400 cc/m$^2$.day.atm. (30 Deg. C, dry) or less, preferably 300, cc/m$^2$.day.atm. (30 Deg. C, dry) or less, and a carbon dioxide/oxygen GTR ratio of 5 or more, preferably 6 or more.

While the core layer may be used independently as described in the foregoing, it is particularly preferable with a view to improving the water repellency and heat sealability and securing a practical strength that it be used in the form of a laminate obtained by laminating onto it layers of other kinds of thermoplastic resin. The laminate may be constructed of two layers consisting of the core layer and a layer of another resin, or three or more layers consisting of the core layer and layers of other kinds of thermoplastic resins laminated on the both sides of the core layer. Although the two or more outside layers laminated onto the both sides of the core layer may be of a same kind of different kinds of resin, it is preferable that the material of the innermost layer contacting directly to the foods be constructed of a heat sealable resin and the outside layer be constructed of a resin having a reinforcing effect. For the thermoplastic resin layer to be laminated onto the core layer, a type of resin is selected such that it does not impair the selective gas permeability of the core layer. In particular, it is preferable that the laminated thermoplastic layer has an oxygen GTR of 1000 cc/m$^2$.day.atm., 30 microns thickness (30 Deg. C., dry) or more.

As the thermoplastic resin layer to be laminated onto the core layer, the one described in the explanation for the first category of the present invention can be cited as an example.

While the film provided by the present invention may be used for packaging foodstuff at large, it is particularly suitable for use as the packaging material for the cheese product such as natural cheese, coffee bean and the like. Particularly, for the use of packaging natural cheese, there is no need to change the package throughout the whole step, from the ripening stage to the latter stages of physical distribution.

Each category of the present invention is specifically illustrated by examples as follows:

REFERENCE EXAMPLE 1

The amount of carbon dioxide generated and the extent of growth of surface molds in the presence of oxygen during the ripening of natural cheese vary with the kind of natural cheese, the kind of live bacteria and conditions of ripening. Four specimens of packaging material having differentiated thicknesses and compositions (the amount of plasticizer) of the core layer were compared with one another with respect to such performances as the swelling of the packaging material due to generation of gas and growth of surface molds during the ripening step, the carbon dioxide GTR, the oxygen GTR and the carbon dioxide/oxygen GTR ratio as opposed to four typical kinds of cheese. The result of this study is shown in Table 1.

TABLE 1

| Packaging material | 1 | 2 | 3 | 4 |
|---|---|---|---|---|
| Oxygen GTR | 50 | 300 | 500 | 600 |
| Carbon dioxide GTR | 200 | 1000 | 2000 | 3000 |
| Permeability ratio | 4.0 | 3.3 | 4.0 | 5.0 |
| Cheddar cheese | 1/No | 0/No | 0/Yes | 0/Yes |
| Edam cheese | 2/No | 1/No | 0/Yes | 0/Yes |
| Gouda cheese | 2/No | 2/No | 1/Yes | 0/Yes |
| Emmentaler cheese | 2/No | 2/No | 2/No | 1/No |

[Note]
(1) The film construction and layer thickness:
Materials 1–3: EVA/Admer/PVDC/Admer/Ionomer 20/2/7/2/40 microns
Material 4: Same as Material 1–3, except for PVDC layer whose layer thickness is 3.5 microns.
Admer: Manufactured by Mitsui Petrochemical Industries, Ltd.
(2) The description and quantity of plasticizer in the core layer (PVDC):
Material 1: Dibasic acid ester, 0.9 wt. %
Material 2: Polyester, 3.0 wt. %
Material 3: Polyester, 4.0 wt. %
Material 4: Polyester, 4.0 wt. %
(3) The unit of GTR: cc/m$^2$ · day · atm. (30 Deg. C., dry)
(4) Symbols:
Numeral 0 = No swelling, serviceable
Numeral 1 = Slight swelling, serviceable
Numeral 2 = Conspicuous swelling, not serviceable
No = Growth of surface molds is not recognized.
Yes = Surface molds have grown conspicuously.
(5) Conditions of cheese ripening: The sample cheeses had undergone storage for 20 days at 13 Deg. C. and 85% relative humidity.

It is seen from the results set forth in Table 1 that the preferable oxygen GTR is about 400 cc/m$^2$.day.atm. or less and the preferable carbon dioxide/oxygen GTR ratio is 5 or more, although there can be few exceptions to this general tendency.

It is seen from Table 1 that in case PVDC (polyvinylidene chloride resin) is used as the oxygen gas barrier, the attempt to adjust the carbon dioxide GTR by varying the amount of plasticizer added to PVDC results in an increased carbon dioxide GTR and also an increased oxygen GTR if the amount of added plasticizer is increased, hence it becomes difficult to thereby obtain a packaging material having a low oxygen GTR and at the same time a large carbon dioxide/oxygen GTR ratio.

The Method for Measuring Gas Transmission Rates of Oxygen and Carbon Dioxide The gas transmission rates to both oxygen and carbon dioxide were measured simultaneously at 30 Deg. C., using a gas GTR testing apparatus GTR-10A manufactured by Yanagimoto Manufacturing Co.

REFERENCE EXAMPLE 2

Measured values of the solubilities of carbon dioxide and oxygen and the solubility ratio between the two (SCO$_2$/SO$_2$) of the compound (B) and other compounds as comparative specimens are given in Table 2.

TABLE 2

| Organic compounds | Solubility (ml/ml) SCO$_2$ | SO$_2$ | Solubility ratio (SCO$_2$/SO$_2$) |
|---|---|---|---|
| n-propanol | 0.88 | 0.12 | 7 |
| Glycerin | 0.04 | 0.002 | 20 |
| Isooctane | 1.60 | 0.20 | 8 |
| Dioctyl adipate | 1.64 | 0.14 | 12 |
| Dibutyl sebacate | 2.80 | 0.56 | 5 |
| 1,4-butanediol | 0.85 | 0.007 | 127 |
| Ethlene glycol | 0.81 | 0.013 | 62 |
| PEG (*) | 1.63 | 0.031 | 53 |

TABLE 2-continued

| Organic compounds | Solubility (ml/ml) SCO$_2$ | SO$_2$ | Solubility ratio (SCO$_2$/SO$_2$) |
|---|---|---|---|
| Lactic acid | 1.10 | 0.008 | 137 |

*The average molecular weight: 600

The Method for Measuring Solubilities of Oxygen and Carbon Dioxide

The solubilities of carbon dioxide and oxygen were measured in accordance with the saturation method as described in the New Series of Lectures on Experimental Chemistry (Shin Jikken Kagaku Koza) [I] pages 124–243 (Maruzen Co., Ltd., Tokyo, Japan, 1985).

The solubility of carbon dioxide and the solubility of oxygen in those organic chemicals set forth in Table 2, respectively, were measured at 23 Deg. C., using the apparatus illustrated in FIG. 1.

The solubility was calculated by the following equation:

$$\text{alpha} = (a \times V_0)/(76 \times V_1) \times 76/(76-a)$$

where
"alpha" is the solubility,
"$V_0$" is the space volume (ml),
"$V_1$" is the amount of specimen (ml), and
"a" is the pressure differential on a mercury manometer (cmHg)

Explanation on FIG. 1

Operating procedures for the apparatus for measuring the solubilities of carbon dioxide and oxygen in organic compounds as illustrated in FIG. 1 are as follows:

1. Close the valve I and open the vacuum valves A, D, E, and F to evacuate air through A, using a vacuum pump. G is a vessel containing compound(B).
2. Close the valve A after evacuation is complete and introduce the specimen gas through the valve B, with the prevailing pressure adjusted to 0 kg/cm$^2$ gage P.
3. After the specimen gas has been introduced, quickly close the valves D and F, then open the valve I and the vacuum in the system is measured by the mercury manometer.
4. In measuring the vacuum, the reading is taken when the pressure has become constant, namely, when the saturation is reached.

REFERENCE EXAMPLE 3

Measurement of the degree of saponification of each kind of PVA and the saturated solubility of PEG, etc. in PVA 10 g. each of PVA (the degree of polymerization: 500) varying in the degree of saponification was precisely weighed out and 20 g. each of PEG was added to it and the samples were left to stand for 24 hours at 60 Deg. C. This impregnated substance was formed by a hot press (200 Deg. C., 100 kg/cm$^2$, 2 minutes). After wiping off with paper towel PEG which had exudated from the formed article, a compression molded sheet was obtained. The sheet thus obtained was weighed and the saturated solubility was calculated on the basis of the amount of PEG contained in the sheet. Likewise, the saturated solubility of lactic acid and 1,4-butanediol in PVA (the degree of polymerization: 500, the degree of saponification: 80 mole %) was measured. Results of the measurement are set forth in Table 3.

TABLE 3

| Degree of saponification (mole %) | Saturated solubility (PHR) | |
|---|---|---|
| 60 | PEG | 170 |
| 80 | PEG | 27 |
| 88 | PEG | 8.5 |
| 98.5 | PEG | 4.7 |
| 80 | Lactic acid | 70 |
| 80 | 1,4-butanediol | 57 |

EXAMPLES 1-3 AND COMPARATIVE EXAMPLES 1-3

8.5 weight parts each of PEG (the average molecular weight: 600) were mixed with 100 weight parts of PVA (manufactured by Kuraray Co., the degree of polymerization: 500) prepared in three different degrees of saponification, i.e. 60 mole %, 80 mole % and 88 mole %. Each sample was aged overnight in a dry atmosphere maintained at 60 Deg. C. The obtained composition was melt kneaded by a twin-screw extruder (BT-30, 30 mm diameter, manufactured by Research Laboratory of Plastic Technology Co., Ltd.) and then pelletized by a chill roll-type pelletizer. The extruding conditions of said extruder are as set forth in Table 4.

TABLE 4

| Extrusion test | Degree of Saponification of PVA (mole %) | C1 | C2 | C3 (Deg. C.) | C4 | C5 |
|---|---|---|---|---|---|---|
| 1 | 60 | 100 | 120 | 135 | 140 | 140 |
| 2 | 80 | 100 | 120 | 160 | 180 | 180 |
| 3 | 88 | 100 | 120 | 170 | 180 | 190 |

| Extrusion test | H-1 (Deg. C.) | D-1 (Deg. C.) | Extrusion rate (g/min.) |
|---|---|---|---|
| 1 | 130 | 130 | 90 |
| 2 | 180 | 180 | 50 |
| 3 | 190 | 190 | 50 |

The obtained pellet was formed into a film having a thickness of 100 to 120 microns by a hot press with the press temperature maintained at 180 Deg. C. The obtained film was used as the sample for measuring the oxygen and carbon dioxide GTR's.

As a comparative example, the PVA without any PEG mixed in it was formed into a film by the compression molding technique and the obtained film was subjected to a similar test to the one described above. The result of this test is set forth in Table 5. It is seen from the test result that the carbon dioxide/oxygen GTR ratio of PVA film is markedly improved by adding PEG to the PVA.

TABLE 5

| | Examples | | | Comparative Examples | | |
|---|---|---|---|---|---|---|
| | 1 | 2 | 3 | 1 | 2 | 3 |
| Deree of saponification of PVA (mole %) | 60 | 80 | 88 | 60 | 80 | 88 |
| PEG (weight parts) | 8.5 | 8.5 | 8.5 | 0 | 0 | 0 |
| Oxyen GTR (*1) | 142 | 33 | 9 | 22 | 1.5 | 0.5 |
| Carbon dioxide GTR (*1) | 1065 | 274 | 79 | 88 | 6.0 | 2.0 |
| Carbon dioxide/ Oxygen (GTR) | 7.5 | 8.3 | 8.8 | 4.0 | 4.0 | 4.0 |

TABLE 5-continued

|  | Examples | | | Comparative Examples | | |
|---|---|---|---|---|---|---|
|  | 1 | 2 | 3 | 1 | 2 | 3 |
| ratio | | | | | | |

*1: The unit = cc/m$^2$ · day · atm., 60 microns thickness (30 Deg. C., dry)

EXAMPLES 4-11

5 to 30 weight parts each of PEG (the average molecular weight: 600) were mixed with 100 weight parts of PVA (manufactured by Kuraray Co., the degree of polymerization: 500) prepared in three different degrees of saponification, i.e. 60 mole %, 80 mole % and 88 mole %. Each sample was aged overnight in a dry atmosphere maintained at 60 Deg. C. The obtained composition was melt kneaded by a twin-screw extruder (BT-30, 30 mm diameter) and was pelletized by a chill roll-type pelletizer. The extruding conditions of the twin-screw extruder for each PVA sample are identical with those set forth in Table 4.

The obtained pellet was compression molded into film having a 100 to 120 micron thickness with the press temperature maintained at 180 Deg. C. Then, each obtained film was used as a sample for measuring the oxygen GTR and carbon dioxide GTR. The test results are shown in Table 6.

TABLE 6

|  | Examples | | | | | | | |
|---|---|---|---|---|---|---|---|---|
|  | 4 | 5 | 6 | 7 | 8 | 9 | 10 | 11 |
| Degree of saponification of PVA (mole %) | 60 | 60 | 60 | 80 | 80 | 80 | 80 | 80 |
| PEG (weight parts) | 5 | 10 | 20 | 5 | 10 | 15 | 20 | 27 |
| Oxyen GTR (*1) | 80 | 186 | 390 | 15 | 62 | 165 | 230 | 263 |
| Carbon dioxide GTR (*1) | 480 | 1525 | 4212 | 100 | 564 | 1859 | 2852 | 3445 |
| Carbon dioxide/ Oxygen (GTR) ratio | 6.0 | 8.2 | 10.8 | 6.7 | 9.1 | 11.3 | 12.4 | 13.1 |

*1: The unit = cc/m$^2$ · day · atm., 60 microns thickness (30 Deg. C., dry)

It can be seen from Table 6 that the carbon dioxide/oxygen GTR ratio of the film increases with an increase in the amount of PEG compounded, thus demonstrating that the film possesses excellent properties required as a material for packaging cheese.

EXAMPLES 12 TO 15

10 weight parts each of 1,2-butanediol (Example 12), 1,3-butanediol (Example 13), 1,4-butanediol (Example 14), and lactic acid (Example 15) were added to 100 weight parts of PVA having the degree of saponification of 80 mole % (manufactured by Kuraray Co., the degree of polymerization: 500) and each sample was mixed and then was aged in a dry atmosphere maintained at 70 Deg. C. overnight. The composition thus obtained as compression molded into a sheet having the thickness of 120 microns with the press temperature maintained at 180 Deg. C. Then, each sample was measured for its oxygen GTR and carbon dioxide GTR. The test results are shown in Table 7.

EXAMPLE 16

10 weight parts (0.2 g) of lactic acid per 100 weight parts of PVA (PVA 405 manufactured by Kuraray Co., the degree of polymerization: 500) were added to 20 g of a 10 weight % aqueous solution of the PVA having the degree of saponification of 80 mole %, which were mixed together with agitation to obtain a liquid mixture. The obtained mixture was dripped onto a glass plate, and the glass plate was left to stand for 3 days at room temperature, so that a film would be produced by deposition as if by the solution casting technique. The thus obtained film having a thickness of 48 microns was subjected to measurement of the oxygen GTR and carbon dioxide GTR. The test results are shown in Table 7.

COMPARATIVE EXAMPLES 4-5

10 weight parts each of glycerin (Comparative Example 4), dioctyl adipate (Comparative Example 5) were mixed with 100 weight parts each of PVA (PVA 405 manufactured by Kuraray Co., the degree of polymerization: 500) having a degree of saponification of 80 mole %. The mixture was aged overnight in a dry atmosphere maintained at 70 Deg. C. The mixture was formed into a sheet having a thickness of 120 microns by the compression molding technique with the press temperature maintained at 180 Deg. C. The obtained film was measured for its oxygen GTR and carbon dioxide GTR. The test results are shown in Table 7.

TABLE 7

|  | Mixture components | Oxygen GTR (*1) | Carbon dioxide GTR (*1) | Carbon dioxide/ oxygen (GTR) ratio |
|---|---|---|---|---|
| Examples | | | | |
| 12 | PVA + 1,2-butanediol | 23 | 550 | 24 |
| 13 | PVA + 1,3-butanediol | 26 | 250 | 9.6 |
| 14 | PVA + 1,4-butanediol | 26 | 473 | 18 |
| 15 | PVA + Lactic acid | 4.5 | 65 | 14.4 |
| 16 | PVA + Lactic acid | 153 | 1255 | 8.2 |
| Comparative Examples | | | | |
| 4 | PVA + Glycerin | 11 | 25 | 2.5 |
| 5 | PVA + Dioctyl (adipate) | 4.2 | 7.0 | 1.7 |

*1: The unit = cc/m$^2$ · day · atm, 60 microns thickness (30 Deg. C., dry)

EXAMPLES 17-20 AND COMPARATIVE EXAMPLE 6

PVA (manufactured by Kuraray Co., the degree of saponification of 60 mol %, the degree of polymerization: 500) and PEG (the average molecular weight: 600) were mixed together by the weight parts set forth in the footnote of Table 8, and the mixture was aged overnight in a dry atmosphere maintained at 60 Deg. C. Certain amounts of the obtained composition and EVOH (the ethylene content=44 mole %, the degree of saponification: 99 mole %, and the melt viscosity at 210 Deg. C. and a shear rate of $10^2 sec^{-1} = 0.6 \times 10^4$ poise) were dry blended, melt kneaded by a twin-screw extruder (BT-30, 30 mm diameter), and then pelletized by a chill roll-type pelletizer. The obtained blended pellet (for the core layer), an ethylene/vinylacetate copolymer resin (EVA) (for the outside layer), an ionomer resin (for the inside layer) and an adhesive resin ("Admer" SF750, manufactured by Mitsui Petrochemical Industries, Ltd., MI=4.7) (for the adhesive layer) were melt kneaded individually in separate extruders, and were melt coextruded by a coextruding apparatus with the resin temperature maintained at 200 Deg. C. and then stretched 2.5×3.2 times to obtain a film constructed of 5 layers, namely, the ethylene/vinylacetate layer, the adhesive layer, the core layer, the adhesive layer, and the ionomer layer. Results of measurement of the gas GTR, etc. of the obtained film are shown in Table 8. It can be seen from Table 8 that the GTR ratio of this laminated film has increased if the composition of the invention disclosed in the present application is used.

weight: 600) were mixed together. Results of the measurement of GTR of the obtained ratio are shown in Table 9.

Likewise, the same procedure as employed in Example 17 was followed in order to obtain data as Comparative Example 8, except that PVA (the degree of polymerization: 500) having a degree of saponification of 98.5 mole % was used. However, the attempt to melt extrude the mixture ended in failure, as the crystalline melting point of PVA (220 Deg. C.) is higher than the thermal decomposition initiating temperature (190 Deg. C.) and said two temperature levels are close to each other.

TABLE 9

|  | Layer construction | Each layer thickness (microns) | Oxygen GTR (*1) | Carbon dioxide GTR (*1) | Carbon dioxide/oxygen (GTR) ratio |
| --- | --- | --- | --- | --- | --- |
| Comparative Example |  |  |  |  |  |
| 7 | EVA/Adhesive/Core4/Adhesive/Ionomer | 20/3/19/3/50 | 1000 | 3900 | 3.9 |

*1: The unit = $cc/m^2 \cdot day \cdot atm.$, (30 Deg. C., dry)
Core4: EVOH + PVA + PEG = 40 + 60 + 10 (weight parts)

EXAMPLES 21-24

The below-specified weight parts of PVA (manufactured by Kuraray Co., the degree of saponification: 80 mole %, the degree of polymerization: 300) and PEG (the average molecular weight: 600) were mixed together and the mixture was aged in a dry atmosphere maintained at 60 Deg. C. overnight. Then, the obtained material was dry blended with a specified amount of the same EVOH as used in Example 17 into pellets. Successively, this blended pelletized material (the core layer),

TABLE 8

|  | Layer construction | Each layer thickness (microns) | Oxygen GTR (*1) | Carbon dioxide GTR (*1) | Carbon dioxide/oxygen (GTR) ratio |
| --- | --- | --- | --- | --- | --- |
| Examples |  |  |  |  |  |
| 17 | EVA/Admer/Core1/Admer/Ionomer | 20/3/19/3/35 | 102 | 900 | 8.8 |
| 18 | EVA/Admer/Core1/Admer/Ionomer | 23/3/15/3/37 | 146 | 1150 | 7.8 |
| 19 | EVA/Admer/Core2/Admer/Ionomer | 19/3/18/3/53 | 340 | 3820 | 11.2 |
| 20 | EVA/Admer/Core2/Admer/Ionomer | 16/3/24/3/64 | 320 | 3580 | 11.2 |
| Comparative Example |  |  |  |  |  |
| 6 | EVA/Adhesive/Core3/Adhesive/Ionomer | 20/3/20/3/30 | 13 | 52 | 4.0 |

*1: The unit = $cc/m^2 \cdot day \cdot atm.$, (30 Deg. C., dry)
Core1: EVOH + PVA + PEG = 40 + 60 + 10 (weight parts)
Core2: EVOH + PVA + PEG = 40 + 60 + 20 (weight parts)
Core3: EVOH + PVA + PEG = 40 + 60 + 0 (weight parts)
EVA: EVA (ethylene/vinylacetate) 3753, manufactured by Sumitomo Chemical Industry Co., having an oxygen GTR of: $2.1 \times 10^3 cc/m^2 \cdot day \cdot atm.$, 20 microns thickness (30 Deg. C., dry)
Ionomer: AM7908-2, manufactured by DuPont Mitsui Polychemicals Co., Ltd., having an oxygen GTR of: $9.2 \times 10^4$ $cc/m^2 \cdot day \cdot atm.$, 30 microns thickness (30 Deg. C., dry)

COMPARATIVE EXAMPLES 7-8

A five-layer oriented film (Comparative Example 7) was obtained by the same procedure as employed in Example 17, except that the below-specified weight parts of PVA (manufactured by Kuraray Co., the degree of saponification: 55 mole %, the degree of polymerization: 500) and PEG (the average molecular weight: 600) were mixed together. Results of the measurement of GTR of the obtained ratio are shown in Table 9.

low-density polyethylene (LDPE) (the outside layer and the inside layer) and adhesive resin ("Admer" SF 750, manufactured by Mitsui Petrochemical Industries, Ltd. MI=4.7) were individually melt kneaded by separate extruders, and then were melt coextruded through a T-shape die with the resin temperature maintained at 200 Deg. C. Thus was obtained a 5-layer unoriented film constructed of LDPE/Admer/the core/Admer/LDPE.

Measured GTR's of the obtained film are shown in Table 10.

TABLE 8

| | Layer construction | Each layer thickness (microns) | Oxygen GTR (*1) | Carbon dioxide GTR (*1) | Carbon dioxide/ oxygen (GTR) ratio |
|---|---|---|---|---|---|
| Examples | | | | | |
| 21 | LDPE/Adhesive/Core5/ Adhesive/LDPE | 17/5/25/5/30 | 100 | 960 | 9.6 |
| 22 | LDPE/Adhesive/Core5/ Adhesive/LDPE | 36/5/38/5/34 | 75 | 780 | 10.4 |
| 23 | LDPE/Adhesive/Core6/ Adhesive/LDPE | 20/5/19/5/17 | 125 | 1200 | 9.6 |
| 24 | LDPE/Adhesive/Core6/ Adhesive/LDPE | 30/5/49/5/30 | 70 | 690 | 9.9 |

*1: The unit = cc/m$^2$ · day · atm., (30 Deg. C., dry)
Core5: EVOH + PVA + PEG = 30 + 70 + 12 (weight parts)
Core6: EVOH + PVA + PEG = 40 + 60 + 12 (weight parts)
LDPE: Sumikathene L708, manufactured by Sumitomo Chemical Industry Co., Ltd., MI = 10, the density = 0.918

EXAMPLES 25-26

Using the 5-layer unoriented film obtained in Example 21 (Example 25) and Example 23 (Example 26), package tests were carried out on two kinds of shred-type cheese. The following two kinds of cheese were used as specimens:

"Samsoe", a produce of Denmark, characterized by a high carbon dioxide generation rate "Maribo", a produce of Denmark, characterized by a low carbon dioxide generation rate Results of the visual inspection made on the samples are shown in Table 11. In either sample, there was not observed visible growth of surface molds.

The Test Method 200 g each of the aforementioned cheese was packed in 5 bags, each of which being prepared by heat sealing a piece of film cut out from each kind of the sample packaging material along both sides and one end. After displacing the interior of the bag with a mixture gas consisting of 70% oxygen gas and 30% carbon dioxide gas, the remaining open end of the bag was heat sealed. The size of the packed bag was 140×200 mm.

The samples thus prepared were stored at 15 Deg. C. and 68% relative humidity, and after the lapse of given storage periods the packed products were observed with respect to visible growth of surface molds and swelling of the bag.

COMPARATIVE EXAMPLE 9

Using a multilayer film constructed of EVA/Adhesive/PVDC/Adhesive/Ionomer (the thicknesses: 20/2/7/2/40 microns), cheese was packed according to the same procedure as employed in Examples 25-26, and the packaged product was visually inspected. The oxygen GTR of this film was 180 cc/m$^2$.day.atm. (30 Deg. C., dry) and the carbon dioxide GTR was 690 cc/m$^2$.day.atm. (30 Deg. C., dry), and the carbon dioxide/oxygen (GTR) ratio was 3.8.

Results of the visual inspection are shown in Table 11. In either sample, there was not observed visible growth of surface molds.

TABLE 11

| Description of cheese | Packaging material | Storage period (days) | | | | |
|---|---|---|---|---|---|---|
| | | 1-6 | 7 | 13 | 15 | 20 |
| Samsoe | Example 25 | 00000 | 00000 | 00000 | 00000 | 00000 |
| | Example 26 | 00000 | 00000 | 00100 | 00001 | 00101 |
| | Comparative Example | 00000 | 11111 | 12222 | 22222 | 22222 |
| Maribo | Example 25 | 00000 | 00000 | 00100 | 00100 | 00101 |
| | Example 26 | 00000 | 00000 | 00000 | 00100 | 00101 |
| | Comparative Example 9 | 01000 | 01000 | 12122 | 22222 | 22222 |

[Note]
0 = No swelling of bag; serviceable
1 = Slight swelling of bag; serviceable
2 = Conspicuous swelling of bag, not serviceable As can be seen from Table 11, the film did not undergo such practical problems as swelling of the bag due to generation of carbon dioxide gas and growth of surface molds. On the other hand, the film described in Comparative Example 9 was practically inadequate, inasmuch as there occurred conspicuous swelling of the packaging bag due to its low carbon dioxide GTR.

What is claimed is:

1. A food packaging article including at least one layer of a 3 to 90 microns thickness which comprises a composition consisting of polyvinyl alcohol resin (A) having a degree of saponification of 60 to 95 mole % and a composition selected from monomers of alkylene glycol and hydroxy acids and polymers thereof (B$_1$) falling in the range of from 3 weight parts of (B$_1$) per 100 weight parts of (A) to the saturated solubility of (B₁) in (A) and having a carbon dioxide/oxygen solubility ration (SCO$_2$/SO$_2$) of 30 or higher.

2. A food packaging article described in claim 1 wherein (B₁) is butanediol, ethylene glycol or polymers thereof.

3. A food packaging article described in claim 1 wherein (B₁) is lactic acid or a polymer thereof.

4. A food packaging article described in claim 1 which is in the form of film, sheet or tray.

5. A food packaging article described in claim 1, for packing cheese.

6. A melt extruded article including at least one layer comprising a resin composition consisting of polyvinyl alcohol resin having a degree of saponification of 60 to 95 mole % (A), a compound selected from a group of alkylene glycol monomer and a polymer thereof and having a carbon dioxide/oxygen solubility ratio (SCO$_2$/SO$_2$) of 30 or higher(B₂), and a saponified ethylene/vinylacetate copolymer resin (C), the blending ratio of (B₂) being within the range of from 3 weight parts of (B₂) to 100 weight parts of (A) to the saturated solubility of (B₂) in (A), and the blending ratio of (C) being within the range of 20 to 50 weight parts of (C) to 100 weight parts of an aggregate of (A) and (C).

7. A melt extruded article described in claim 6 which is a food packaging film.

8. A food packaging film described in claim 7, the kind of food intended for packaging being cheese.

* * * * *